United States Patent [19]

Rusznák et al.

[11] Patent Number: 4,534,782
[45] Date of Patent: Aug. 13, 1985

[54] METHOD FOR INCREASING THE BIOLOGICAL VALUE OF MANURES, DUNG-WATERS, ORGANIC WASTES AND/OR SOILS RICH IN LYSINE

[75] Inventors: István Rusznák; Lajos Trézl, both of Budapest; Dezsö Földesi, Budakalász-felsö; Béla Szabó, Tiszaföldvár; Imre Bódi, Tiszaföldvár; Szilveszter Császár, Tiszaföldvár; Mihály Szopko, Szeged; Mihály Gombár, Tiszaföldvár; Gabriella Kovács; Ernö Tyihák, both of Budapest, all of Hungary

[73] Assignees: Magyar Tudományos Akadémia Központi Hivatala, Budapest; Lenin Mezögazdasági Termelöszövetkezet, Tiszaföldvár, both of Hungary

[21] Appl. No.: 309,224

[22] Filed: Oct. 6, 1981

[30] Foreign Application Priority Data

Aug. 10, 1980 [HU] Hungary ............................. 2447/80

[51] Int. Cl.$^3$ ................................................ C05F 3/00
[52] U.S. Cl. ............................................ 71/21; 71/27; 71/903
[58] Field of Search .................. 71/12, 75, 21, 23, 27; 422/36; 426/807

[56] References Cited

U.S. PATENT DOCUMENTS 4,073,945  2/1978  Bertram et al. ................. 426/807 X
4,117,175  9/1978  Senior ............................. 426/807 X
4,160,656  7/1979  Junkermann ........................... 71/21

FOREIGN PATENT DOCUMENTS 197803  3/1978  Fed. Rep. of Germany .......... 71/21

Primary Examiner—Ferris H. Lander
Attorney, Agent, or Firm—Keil & Weinkauf

[57] ABSTRACT

The invention relates to a new method for increasing the biological value of manures, dung-waters, organic wastes and/or soils rich in lysine. According to the invention manure, dung-water, an organic waste and/or soil rich in lysine, either of natural composition or supplemented with lysine, a lysine source and/or one or more agricultural chemical(s), is treated with at least 0.01 mole of formaldehyde or an equivalent amount of a formaldehyde source, calculated for one mole of free or bound lysine present.

The treatment according to the invention results in a significant increase of plant growth and crop yield.

11 Claims, No Drawings

METHOD FOR INCREASING THE BIOLOGICAL VALUE OF MANURES, DUNG-WATERS, ORGANIC WASTES AND/OR SOILS RICH IN LYSINE

The invention relates to a new method for increasing the biological value of manures, dung-waters, organic wastes and/or soils rich in lysine. When applying the method of the invention in plant cultivation, a particularly significant increase in crop yield can be attained on various plant cultures.

Various substances have been applied so far in plant cultivation to regulate plant growth, including substances for increasing crop yield, too. These substances are, however, not available in any desired amount and their production is expensive, which restricts their mass use. Furthermore, the mass use of synthetic plant growth regulating agents may lead to undesired environmental damages.

The invention provides a new method by which plant growth can be increased significantly, without the occurrence of the disadvantages mentioned above.

Previous investigations performed on animal organisms have shown that $N^\epsilon$-methylated lysines, including $N^\epsilon$-trimethyl-L-lysine (TML), significantly stimulate cell proliferation both on healthy and on tumerous cells [Szende et al.: Neoplasma 17, 433 (1970); Kopper et al.: Neoplasma 18, 251 (1971)]. Further investigations have also revealed that certain thymus-dependent human lymphocytes undergo blastic conversion upon a single 5 μg/mg or 25 μg/mg dose of $N^\epsilon$-trimethyl-L-lysine [Stotz et al.: Exp. Pathol. (Jena) 9, 317 (1974)]. When studying the synthesis of $N^\epsilon$-trimethyl-L-lysine it has been found that L-lysine, whether in free state or in peptide bond, undergoes spontaneous methylation upon the effect of formaldehyde, to form mono-, di- and trimethyl derviatives with a simultaneous $N^\epsilon$-formylation [Tyihák et al.: Proc. Hung. Ann. Meet. Biochem., Miskolc (1975); Chem. Abstr. 85, 118,182 (1976); Trézl et al.: Proc. 5th Inter. Vool. Text. Res. Conf., Aachen (1975); Chem. Abstr. 87, 7372 (1977); Tyihák et al.: Pharmazie 35, 25 (1980)]. This spontaneous reaction, requiring neither a chemical nor a biological catalyst, may proceed in every system where free or bound L- or D-lysine and formaldehyde are present.

The possible plant biological effects of methylated lysine derivatives were not investigated before.

Now it has been found that when manure, dung-water, organic wastes and/or soils rich in lysine, either of natural composition or supplemented with lysine, a lysine source and/or one or more agricultural chemical(s), is treated with formaldehyde or a source thereof, the biological value of the treated substance increases substantially. The growth rate of plants growing on manures, dung-waters, organic wastes or soils rich in lysine, treated with formaldehyde or a formaldehyde source, is highly superior to that of the plants growing on the same medium under the same conditions but without treatment with formaldehyde (control medium), and the crop yield is the multiple, sometimes the two- or threefold, of that observed with the controls.

Formaldehyde has already been applied for the treatment of soils heavily infected with plant-damaging microorganisms and fungi [French patent specification No. 565,198; Doran et al.: Mass. Agr. Exp. Sta. Ann. Rept. 1939, 23 (1940); Cook et al.: Virginia Truck Expt. Sta. Bulletin 104, 1663 (1940); Danies et al.: N.J. Agr. Exp. Sta. Circular No. 437, 8 (1942); Bewely: Chem. Ind. (London) 63, 237 (1944); Sewell: East Malling Research Station, Report for 1977, 97–99 (1978)]. In these instances the formaldehyde treatment served always to eradicate the microorganisms and fungi which infect the soil and inhibit plant growth. According to the publications cited above the productivity of soil returns to the original (pre-infection) level upon disinfecting it with formaldehyde, and the growth of plants sown or planted into the treated soil becomes practically identical with that observed prior to the outbreak of soil infection. The cited papers also disclose that similar results can be obtained when soil is disinfected with steam or fungicidal or microbicidal agents (e.g. chloropicrine, Furalaxyl, etc.) instead of formaldehyde. None of the cited references deal with the treatment of manures, dung-waters or organic wastes, and do not give any information, either, how plant growth changes when the treatment is performed on a non-infected soil with appropriate productivity.

The significant increase in plant growth and crop yield occurring upon the treatment according to the invention can be attributed presumably to the fact that L- and/or D-lysine, occurring either in free or in bound state in manures, dung-waters, organic wastes and soils rich in lysine, reacts with formaldehyde to form methylated lysine derivatives, i.e. $N^\epsilon$-monomethyl, $N^\epsilon$-dimethyl and $N^\epsilon$-trimethyl compounds, which accelerate cell growth in plant organisms. This recognition was not aforeseen in the knowledge of the cited references. Although it is known that $N^\epsilon$-trimethyl-L-lysine promotes cell proliferation in animal organisms, the construction of animal and plant organisms and the biological mechanism of their growth are so different that one cannot draw reliable plant biological conclusion from the results observed in animal tests. Furthermore, the substances (i.e. manure, dung-water, organic wastes and soils) treated according to the invention contain, beside L-lysine, numerous other components which also react with formaldehyde, the biological effects of these reduction products are, however, unknown, and, owing to the significant differences in the compositions of the treated substances, the prospective biological effects of the possible reaction products cannot be determined in advance, either. Thus it is very surprising that the resultant effect of the treatment according to the invention is an increase in plant growth and crop yield, since it was also to be expected that formaldehyde forms other reaction products which inhibit plant growth, suppressing or counterbalancing thereby the stimulating effect of methylated lysine derivatives. The results attained upon the treatment according to the invention were not aforeseen on the basis of the references dealing with the formaldehyde treatment of soil, either, since according to these references the productivity of soil can be restored only to the original value without any additional increase, furthermore the other soil disinfecting agents considered to have the same effect as formaldehyde (e.g. hot steam, fungicidal agents, etc.) cannot be applied as methylating agents for lysine.

Thus, the invention relates to a new method for increasing the biological value of manures, dung-waters, organic wastes and/or soils rich in lysine. According to the invention one proceeds so that manure, dung-water, an organic waste and/or soil rich in lysine, either of natural composition or supplemented with lysine, a lysine source and/or one or more agricultural chemical(s), is treated with at least 0.01 mole of formaldehyde or an equivalent amount of a formaldehyde source, calculated for one mole of free or bound lysine present.

The term "lysine" encompasses the D, L and DL forms of lysine. The term "lysine source" or "bound lysine" refers to salts and complexes of lysine, and lysine-containing oligopeptides, polypeptides, proteins and salts and complexes thereof. The term "formaldehyde source" refers to any substance capable of releasing formaldehyde under the conditions of the treatment according to the invention. Of the formaldehyde sources e.g. paraformaldehyde, urotropin and compounds containing N-methylol groups (such as methylolurea, methylolmelamine, etc.) are to be mentioned.

The term "soil rich in lysine" refers to soils containing at least 0.001% of lysine either in free or in bound state. This amount of lysine may be present originally in the soil, or may be added to the soil either before or after treating it with formaldehyde, or even simultaneously with the formaldehyde treatment.

The preferred features of the treatment according to the invention are given below.

It is preferred to apply 0.01 to 100 moles of formaldehyde or an equivalent amount of a formaldehyde source for one mole of free or bound lysine. The formaldehyde treatment is performed preferably at 0°–100° C., particularly at 15°–100° C., at a pH between 1 and 13, preferably between 6 and 10. Manures, dung-waters and organic wastes can be treated either separately or as mixtures, or they can be applied onto or into the soil (e.g. by ploughing) prior to the formaldehyde treatment. One can also proceed so that soil is contacted first with formaldehyde or a formaldehyde source, and then manure, dung-water or an organic waste is applied onto the pre-treated soil.

As mentioned above, the treatment according to the invention can also be performed on manures, dung-waters, organic wastes or soils supplemented with lysine or a lysine source. In this instance lysine or a lysine source can be added to the substance before or after treating it with formaldehyde, or formaldehyde and lysine (or their sources) can be introduced simultaneously, even as a single mixture.

The method of the invention can be applied particularly preferably for the treatment of manures, dung-waters, organic wastes or soils enriched with earth metals, earth metal oxides, earth metal carbonates or trace elements. These substances may accelerate the reaction of lysine and formaldehyde, furthermore they are valuable, sometimes even indispensable, components with respect to plant development and growth. The treatment according to the invention can also be performed on soils pre-treated or supplemented with agricultural chemicals, such as fertilizers. Similarly, manures, dung-waters or organic wastes can also be admixed with agricultural chemicals prior to or after treating them with formaldehyde, to obtain soil supplements with complex effects, best fitting for the actual requirements. Whenever compatibility conditions make it possible, the further additives (trace elements, agricultural chemicals, etc.) can also be added to the substance to be treated in admixture with formaldehyde and/or lysine.

As organic wastes it is preferred to apply substances of plant origin with high peptide or protein content, such as corn stalk, sunflower cake, sugar beet leaves, etc.

The soils, manures, dung-waters and/or organic wastes treated according to the invention are allowed to stand for an appropriate period permitting the elimination of the excess of formaldehyde, and sowing or planting is done only thereafter.

The major advantages attained by the method of the invention are as follows:

(a) The treatment according to the invention results in a significant increase of plant growth and crop yield.

(b) It requires substances available without any limitation, such as manures, dung-waters, organic wastes, etc.

(c) Organic wastes not or not sufficiently utilized before can be converted into valuable nutritives for plants.

(d) The treatment according to the invention results in the formation of natural plant growth promoting substances, thus undesired environmental damages do not appear.

(e) The treatment according to the invention also involves disinfection of manures, dung-waters and organic wastes, which is a particular advantage with respect to public health.

The invention is elucidated in detail by the aid of the following non-limiting Examples. The characteristics of the soils used in the tests are given in Table 1.

TABLE 1

| Characteristics | Soil No. I | Soil No. II |
| --- | --- | --- |
| pH (in water) | 7.9 | 7.9 |
| $CaCO_3$ content, % | 16 | 16.2 |
| Impermeability index (according to Arany) | 37 | 43 |
| Total salt content, % | 0.06 | 0.02 |
| Humus content, % | 2.25 | 2.62 |
| Absorbable $P_2O_5$, mg/100 g | 12.1 | 11.9 |
| Absorbable $K_2O$, mg/100 g | 17.1 | 13.2 |

EXAMPLE 1

The tests were performed on No. I soil samples. 0.1% by volume of a nutrient solution, containing 9% of nitrogen, 9% of phosphorous pentoxide, 7% of potassium oxide, vitamin $B_1$ and trace elements (chelates of Fe, Mn, B, Cu, Zn, Co and Mo), was added to the soil 6 months before the treatment.

The soil samples used in the plant cultivation tests were treated as follows:

(a) 3 ml of a 35–40% aqueous formaldehyde solution, diluted with water to the six- to tenfold depending on the humidity content of the soil, were admixed with one liter of soil. The mix was maintained in a plastic bag for 8–10 days, and then vented for 5 weeks. This treatment is termed in the following as "F treatment".

(b) 0.3 g of L-lysine were admixed with one liter of soil. This treatment is termed in the following as "L treatment".

(c) 0.3 g of L-lysine were admixed with one liter of soil, and then soil was treated as described in point (a) above. This combined treatment is termed in the following as "F+L treatment".

Untreated soil served as control.

10 pots each, 200 ml in volume, were filled with the untreated or treated soil samples, and the pots were sunken into plough-field in a random distribution. 2 to 4 *Sedum reflexum* seedlings were planted into each of the pots. The growth of the seedlings was evaluated after 1.5 months. The results observed are listed in Table 2.

TABLE 2

| Treatment | Growth of the overground part (% by weight, related to the weight of the seedlings) | Increase (%, related to the control) |
|---|---|---|
| Untreated (control) | 145 | 0 |
| L treatment | 148 | 2.5 |
| F treatment | 247 | 70 |
| F + L treatment | 292 | 101 |

EXAMPLE 2

The tests described in Example 1 were performed with *Sedum album* plants. The results are listed in Table 3.

TABLE 3

| Treatment | Growth of the overground part (% by weight, related to the weight of the seedlings) | Increase (%, related to the control) |
|---|---|---|
| Untreated (control) | 72 | 0 |
| L treatment | 81 | 11 |
| F treatment | 105 | 46 |
| F + L treatment | 145 | 100 |

EXAMPLE 3

The tests described in Example 2 were performed with NO. II soil samples not treated with nutrient solution. The results are listed in Table 4.

TABLE 4

| Treatment | Fresh weight without roots, mg | Increase (%, related to the control) |
|---|---|---|
| Untreated (control) | 1450 | 0 |
| L treatment | 1360 | −6 |
| F treatment | 2270 | 57 |
| F + L treatment | 2840 | 96 |

The data of Tables 2 to 4 clearly demonstrate that plant growth practically does not change upon treating the soil with L-lysine. A medium increase in growth can be observed upon treating the soil with formaldehyde, which indicates that the soil contains some lysine. On the other hand, a significant increase in growth ($SD_{5\%}=108.8$, $SD_{1\%}=32.1$, $SD_{5\%}=61.1$) can be observed upon the combined treatment, i.e. when soil enriched with lysine is used.

EXAMPLE 4

The tests were performed with No. I soil samples. The soil was treated with 0.1% by volume of a nutrient solution with the composition defined in Example 1 0.5 year before starting the tests. The soil samples were treated as described in Example 1 with the difference that in the L and F+L treatments 1 g of powdery peptone (Witte) was admixed with one liter of soil instead of 0.3 g of L-lysine.

10 pots each, 2 liters in volume, were filled with the treated or control soil samples, and the pots were sunken into plough field in a random distribution. 20 barley grains (*Hordeum sativum*) were sown into each of the pots. The growth of the plants were evaluated 1.5 months after sowing. The results are listed in Table 5.

TABLE 5

| Treatment | Fresh weight without roots, mg | Increase (%, related to the control) |
|---|---|---|
| Untreated (control) | 118 | 0 |
| L treatment | 170 | 44 |
| F treatment | 178 | 51 |
| F + L treatment | 282 | 139 |

The data of Table 5 demonstrate that a significant increase in plant growth ($SD_{5\%}=8.2$) can be attained also when a lysine source, i.e. peptone which contains L-lysine bound in a peptide chain, is utilized instead of free L-lysine.

EXAMPLE 5

30 ml of a concentrated (36–38%) aqueous formaldehyde solution were added to 10 kg of poultry manure, and then the manure was admixed with 2 ml of a nutrient solution with the composition as given in Example 1. The mix was stored for 3 weeks in a closed plastic bag, and then ploughed in a depth of 10 to 15 cm into a soil parcel with an area of 1.5 m×1.5 m. 3 weeks later kohlrabi seeds were sown into the soil. The seeds were sown at the end of April, and the crop was harvested at the end of September. The same test was also performed with untreated manure and with a mix of untreated manure and nutrient solution. The results observed are listed in Table 6.

TABLE 6

| Soil treatment | Weight of the plants, kg |
|---|---|
| Untreated manure | 1.5 |
| Untreated manure + nutrient solution | 1.8 |
| Treated manure + nutrient solution | 2.6 |

EXAMPLE 6

Poultry manure, treated with formaldehyde as described in Example 5, was admixed with starch in a weight ratio of 1:1, and this mixture was applied onto kohlrabi or barley seeds in a weight ratio of 1:1. The dressed seeds were sown into untreated soil. The weight and development grade of the plants at harvest were similar to those given in Examples 4 and 5.

EXAMPLE 7

10 cm deep ditches were dug in 40 cm spaces into a hard sandy soil parcel with an area of 5000 m$^2$, and pigeon manure, pre-treated with formaldehyde, was filled into the ditches in a thickness of 1 cm. (3 ml of 38% formaldehyde solution, diluted previously with water, were applied for 1 kg of pigeon manure.) The manure was covered with an about 1 cm thick soil layer, and then seed tubers of "Dutch rose" potato were placed into the ditches in spaces of 10–15 cm. Thereafter the ditches were filled up with soil.

The same test was repeated on a control parcel, 5000 m$^2$ in area, using untreated pigeon manure.

The plants emerged on the treated parcel were strong and well-developed, and their green colour was deeper than that of the plants emerged on the control parcel.

The plants, sown on 10th May, were harvested on 10th September. The crop yield was 3,600 kg on the control parcel and 5,500 kg on the treated parcel. The tubers collected from the treated parcel were bigger and heavier than those collected from the control parcel.

EXAMPLE 8

Cow manure was treated with 3.5% aqueous formaldehyde solution in a ratio indicated in Table 7. In some of the tests a nutrient solution with a composition described in Example 1 was also added to the manure together with the formaldehyde solution.

The treated manure was ploughed into soil in a depth of 10-15 cm, and barley seeds were sown into the soil in the middle of March. The crop was harvested in the middle of July. The conditions of treatment and the results are listed in Table 7.

TABLE 7

| Treatment of the manure | Manure applied ton/hectare | Crop harvested 100 kg/hectare | Increase (%, related to the control) |
|---|---|---|---|
| Untreated (control) | 40 | 35.0 | 0 |
| 30 liters of 3.5% aqueous formaldehyde solution for 1 ton of manure | 40 | 38.85 | 11.0 |
| 30 liters of 3.5% aqueous formaldehyde solution plus one liter of nutrient solution for 1 ton of manure | 40 | 39.97 | 14.2 |
| 80 liters of 3.5% aqueous formaldehyde solution for 1 ton of manure | 40 | 42.35 | 21.0 |
| 80 liters of 3.5% aqueous formaldehyde solution plus one liter of nutrient solution for 1 ton of manure | 40 | 43.96 | 25.6 |

What we claim is:

1. A method of increasing the biological value of soils which comprises: applying to soil that is to be used to support crop growth a methylated lysine derivative that is formed by treating a lysine source with at least 0.01 mole of formaldehyde or an equivalent amount of a formaldehyde source, calculated for one mole of free or bound lysine that is present, at a pH of from 1 to 13.

2. The method of claim 1, characterized in that 0.01 to 100 moles of formaldehyde or an equivalent amount of a formaldehyde source are applied for one mole of free or bound lysine.

3. The method of claim 1, characterized in that paraformaldehyde, urotropin or a compound containing N-methylol group(s) is applied as formaldehyde source.

4. The method of claim 1, characterized in that the treatment is performed at a temperature of 0° to 100° C.

5. The method of claim 1, characterized in that the treatment is performed at a temperature of 15° to 100° C.

6. The method of claim 1, characterized in that the treatment is performed at a pH between 6 and 10.

7. The method of claim 1, characterized in that the lysine source is manure, dung-waters and/or organic wastes and wherein that source is applied to or mixed with the soil and then treated with formaldehyde or a formaldehyde source.

8. The method of claim 1, characterized in that the lysine source is manure, dung-water or organic waste and wherein said source is treated with formaldehyde or a formaldehyde source before the lysine source is applied to or mixed with the soil.

9. The method of claim 1, characterized in that soil is supplemented with lysine or a lysine source and thereafter the lysine or lysine source is treated with formaldehyde or a formaldehyde source.

10. The method of claim 1, characterized in that the soil is supplemented with lysine or a lysine source simultaneously with the treatment of the lysine or lysine source with formaldehyde or a formaldehyde source.

11. A method as set forth in claim 1, characterized in that the soil is treated with formaldehyde or a formaldehyde source before the lysine or lysein source is added to or mixed with the soil.

* * * * *

UNITED STATES PATENT AND TRADEMARK OFFICE
CERTIFICATE OF CORRECTION

PATENT NO. : 4,534,782
DATED : August 13, 1985
INVENTOR(S) : István RUSZNÁK et al.

It is certified that error appears in the above—identified patent and that said Letters Patent is hereby corrected as shown below:

On the title page:

The date for the Foreign Application Priority Data should read --October 8, 1980--.

Signed and Sealed this

Third Day of December 1985

[SEAL]

Attest:

DONALD J. QUIGG

Attesting Officer

Commissioner of Patents and Trademarks